Patented Apr. 21, 1953

2,636,023

UNITED STATES PATENT OFFICE 2,636,023

COPOLYMERS OF VINYL CHLORIDE, ACRYLONITRILE AND A VINYL PYRIDINE

Paul John Culhane, Wilmington, Del., and George Moore Rothrock, Kenmore, N. Y., assignors to E. I. du Pont de Nemours & Company, Wilmington, Del., a corporation of Delaware No Drawing. Application September 7, 1949, Serial No. 114,465

8 Claims. (Cl. 260—80.5)

This invention relates to the preparation of new and useful vinyl copolymers. In particular, it relates to three-component acetone-soluble copolymers of vinyl chloride, acrylonitrile and a vinyl pyridine, these copolymers being readily dyeable with acid dyestuffs.

A copolymer of vinyl chloride and acrylonitrile containing 45–80% by weight of the former has been found to be soluble in acetone and extremely useful in the preparation of artificial fibers. Yarns prepared from these copolymers possess a high yield point and a good tenacity, fire resistance, water resistance, resistance to insects, fungus, mildew and have good electrical properties. Although the general inertness of the acetone-soluble vinyl chloride/acrylonitrile copolymer is advantageous in most instances, it is a disadvantage when colored products are desired. An oriented yarn that would be readily susceptible to conventional dyeing, for example with acid dyestuffs, would be particularly valuable.

This invention has as an object the preparation of an oriented vinyl chloride/acrylonitrile polymer readily dyed with conventional dyes. Another object is the preparation of acetone-soluble vinyl chloride/acrylonitrile polymers capable of furnishing oriented filaments of high tensile strength and capable of being dyed. Other objects will appear hereinafter.

These objects are accomplished by the invention of oriented, polymeric materials, dyeable with acid dyes, consisting of a three-component copolymer of vinyl chloride, acrylonitrile and a vinyl pyridine and of the process for preparing the same. These vinyl chloride/acrylonitrile/vinyl pyridine copolymer compositions are advantageously prepared in an emulsion system at a pH of from about 8 to about 9 using a free radical-producing catalyst, such as a peroxygen or azo compound. The copolymers preferably contain from 45% to 80% by weight of vinyl chloride, 10% to 45% of acrylonitrile and 2% to 10% of a vinylpyridine. The copolymers are acetone-soluble and are readily shaped into desired forms such as films and filaments.

The following examples, in which parts are by weight, are illustrative of the invention:

Example I

The following materials were charged to a vessel capable of withstanding pressure:

| | Parts |
|---|---|
| Distilled water | 180 |
| Vinyl chloride | 54.0 |
| Acrylonitrile | 5.4 |
| 2-vinyl pyridine | 0.6 |
| Potassium perdisulfate | 0.6 |
| Sodium lauryl sulfate | 0.6 |

The vinyl chloride was added last by condensing it in the container cooled to −30° C. Prior to this operation, but not necessarily prior, the acidity of the reaction mixture was adjusted at a pH of 9 by the addition of 10% aqueous sodium hydroxide. Following the addition of the vinyl chloride the container was closed and polymerization allowed to take place for 18 hours at 40° C. The white emulsion of polymer formed in this period of time was removed and filtered. After washing and drying there were obtained 7.7 parts of an acetone-soluble polymer having a specific viscosity of 0.155 measured as 0.1 gram in 50 cc. acetonylacetone at 30° C. An analysis revealed that this copolymer contained 51.4% vinyl chloride, 40.8% acrylonitrile, and 7.8% vinyl pyridine.

A film was cast from a 16% solution of this copolymer in acetonylacetone. The film was boiled for an hour in an aqueous solution containing 5% of Pontacyl Rubine R (Color Index No. 179), based on the weight of film, and 5% sulfuric acid, based on the weight of film. In this manner the film was dyed to a deep red shade. A film prepared in a similar manner from a two-component copolymer of vinyl chloride and acrylonitrile, containing approximately 55% vinyl chloride, took up practically no dyestuff under the same conditions.

Example II

The preferred dyeable copolymer is prepared by adding the rapid polymerizing monomers, acrylonitrile and 2-vinyl pyridine, throughout the reaction. The following materials are charged to an autoclave:

| | Parts |
|---|---|
| Vinyl chloride | 92 |
| Acrylonitrile | 7.0 |
| 2-vinyl pyridine | 1.0 |
| Potassium perdisulfate | 0.5 |
| Sodium lauryl sulfate | 1 |
| Distilled water | 300 |

The pH of the reaction mixture is adjusted at 8.0 and maintained there throughout the polymerization reaction by suitable periodic additions of aqueous sodium hydroxide. The autoclave is closed, the agitator started, and the temperature raised to 40° C. and maintained throughout the reaction. The pressure is maintained at about 80 lbs./sq. in. and 0.50 part of a mixture of 92% acrylonitrile and 8% 2-vinyl pyridine are added to the autoclave each hour. After 50 hours, a 49% yield of a copolymer containing 58.5% vinyl chloride is obtained. An analysis of the slurry for 2-vinyl pyridine indicates that the polymer contains 4.9% vinyl pyridine. The copolymer resin has a specific viscosity of 0.305, measured as 0.1 gram of polymer in 50 cc. of acetonylacetone at 30° C. and is soluble in acetone.

The three-component copolymer described in Example II, is dissolved in acetone to yield a spinning solution having a total solids content of 17%, is dry-spun into yarn by standard techniques. The yarn is stretched 800% in a steam cell at 103° C. The stretched yarn is placed in skein form in boiling water for one hour. After this stabilization treatment, the yarn has a tenacity of 3.5 grams per denier and an elongation of 30%. It shrinks less than 2% in boiling water.

The three-component copolymer yarn prepared in this manner dyes readily to a deep red shade when placed in a boiling aqueous bath containing 5% Pontacyl Carmine 6B (Color Index No. 57) and 5% sulfuric acid, based on the weight of yarn. On the other hand, yarn prepared in the same manner from a two-component copolymer of vinyl chloride and acrylonitrile containing approximately 55% vinyl chloride was only very lightly tinted when dyed under the same conditions.

By continually fortifying the polymerization mixture with the monomers and maintaining the desired pH, the copolymer may be continually removed. This continuous process is desirable for economic production.

*Example III*

The following ingredients are charged to an autoclave:

| | Parts |
|---|---|
| Vinyl chloride | 92 |
| Acrylonitrile | 6 |
| 5-ethyl-2-vinyl pyridine | 2 |
| Potassium perdisulfate | 0.5 |
| Sodium lauryl sulfate | 1 |
| Distilled water | 300 |

The pH of the reaction mixture is adjusted at 8.5 and maintained there throughout the polymerization reaction. The polymerization is conducted as described in Example II, the temperature again being held at 40° C. A mixture of 85% acrylonitrile and 15% 5-ethyl-2-vinyl pyridine is added periodically to the autoclave at the rate of 0.50 part per hour. After 50 hours, a 51% yield of copolymer containing 60.2% vinyl chloride is obtained. An analysis of the slurry for 5-ethyl-2-vinyl pyridine indicates that the copolymer contains about 8.8% 5-ethyl-2-vinyl pyridine. The copolymer product dissolves in acetone to give a clear, easily filterable solution suitable for the preparation of artificial fibers or films. Films oriented by drawing five times their original length are readily dyed from boiling aqueous baths containing the acid-type dyestuffs, such as the following:

| | |
|---|---|
| Pontacyl Light Yellow GG | Color Index No. 636 |
| Pontacyl Fast Blue R | Color Index No. 208 |
| Anthraquinone Blue SEN | Color Index No. 1053 |
| Anthraquinone Green G | Color Index No. 1078 |
| Azo Eosine G | Color Index No. 114 |
| Anthraquinone Violet R | Color Index No. 1080 |
| Du Pont Orange RO | Color Index No. 161 |
| Pontacyl Carmine 6B | Color Index No. 57 |

The films are dyed to good, deep shades with excellent wash fastness and acceptable light fastness.

The vinyl pyridines which can be copolymerized with vinyl chloride and acrylonitrile in accordance with this invention, include the 2-, 3-, and 4-vinyl pyridines and the corresponding polymerizable vinyl pyridines which may have hydrocarbon groups of preferably a total of not more than four carbon atoms attached to the pyridine nucleus, that is, preferably vinyl pyridines having only carbon, hydrogen and the pyridine nitrogen. Examples of vinyl pyridines that may be employed in the production of the copolymers of this invention include 5-ethyl-2-vinyl pyridine, 4,6-dimethyl-2-vinyl pyridine, 4-ethyl-2-vinyl pyridine, 2-methyl-5-vinyl pyridine, 6-methyl-2-vinyl pyridine and 2- and 4-vinyl quinoline. In view of its availability, 2-vinyl pyridine is preferred.

The polymerization reaction should be carried out in basic medium, preferably in pH range of 8.0–9.0. In this range, polymers which are soluble in acetone are formed and these polymers generally have higher viscosity than those prepared at other pH conditions. In acidic medium, a very low yield of polymer is obtained and the polymer is insoluble in acetone. This is in contrast to the results obtained in the copolymerization reaction in the absence of the third component, vinyl pyridine. At the higher pH's, such as pH 10 and above, hydrolysis seems to occur, the viscosity is low and the polymer is gelatinous in nature.

During polymerization the temperature should be maintained at from about 30° C. to about 80° C. The ratio of vinyl chloride to acrylonitrile to vinyl pyridine used should be in the range 85 to 98 parts of vinyl chloride, 1.7 to 13.8 parts of acrylonitrile and 0.15 to 2.25 parts of the vinyl pyridine. Preferably, this ratio is maintained during polymerization whether by the batch or continuous process. The polymers prepared by these methods are acetone-soluble and have specific viscosities of from 0.1 to 0.5 measured as 0.1 gram of polymer in 50 cc. of acetonylacetone at 30° C.

This invention provides a new copolymer which has extremely high utility in the preparation of shaped articles which are capable of being dyed readily by standard commercial techniques. Attempts have been made to achieve the same results by preparing a mixture of the two-component copolymer of vinyl chloride and acrylonitrile with polyvinyl pyridine. Since polyvinyl pyridine is insoluble in acetone, a homogeneous solution in acetone cannot be formed for use in the preparation of shaped articles. The polymers are compatible, however, in dimethyl formamide and films have been cast from such a solution. These films dye with acid dyes, but much lighter shades are obtained than for an equal amount of vinyl pyridine in the three-component copolymer of this invention.

The three-component copolymers of this invention are particularly useful in the preparation of fibers. These copolymers containing from 2–10% of a vinyl pyridine have the desirable physical properties of the acetone-soluble vinyl chloride/acrylonitrile copolymers in addition to good dye absorption properties, particularly for acid dyestuffs.

Any departure from the above description which conforms to the present invention is intended to be included within the scope of the claims.

We claim:

1. An acetone-soluble copolymer of vinyl chloride, acrylonitrile and vinyl pyridine containing 45% to 80% by weight of vinyl chloride, 10% to 45% of acrylonitrile and 2% to 10% of a vinyl pyridine.

2. A copolymer in accordance with claim 1 in which the said vinyl pyridine is 2-vinyl pyridine.

3. An acetone-soluble copolymer of vinyl chloride, acrylonitrile and a vinyl pyridine, the said polymer containing 45% to 80% vinyl chloride, 10% to 45% of acrylonitrile and 2% to 10% of a vinyl pyridine and 0.1 gram of which copolymer in 50 cc. of acetonylacetone has a specific viscosity at 30° C. of between 0.1 and 0.5.

4. A process for the polymerization of vinyl chloride, acrylonitrile and a vinyl pyridine to produce a polymer containing 45% to 80% of vinyl chloride, 10% to 45% of acrylonitrile and 2% to 10% of a vinyl pyridine which comprises emulsifying vinyl chloride, acrylonitrile and a vinyl pyridine in water; adjusting the pH of a resultant mixture to from 8.0 to 9.0; and copolymerizing the vinyl chloride, acrylonitrile and vinyl pyridine in a closed vessel while maintaining the resultant mixture at the said pH.

5. A process in accordance with claim 4 in which the said vinyl pyridine is 2-vinyl pyridine.

6. A process in accordance with claim 4 in which additional acrylonitrile and 2-vinyl pyridine are added during the polymerization reaction.

7. A process for making an acetone-soluble copolymer containing 45% to 80% of vinyl chloride, 10% to 45% of acrylonitrile and 2% to 10% vinyl chloride, acrylonitrile and a vinyl pyridine in water; adjusting the pH of the resultant mixture to from 8.0 to 9.0; and copolymerizing the of a vinyl pyridine which comprises emulsifying vinyl chloride, acrylonitrile and vinyl pyridine in a closed vessel.

8. A process for making an acetone-soluble copolymer containing 45% to 80% vinyl chloride, 10% to 45% of acrylonitrile and 2% to 10% of a vinyl pyridine which comprises emulsifying acrylonitrile and a vinyl pyridine in water; adjusting the pH of the resultant mixture to from 8.0 to 9.0; adding vinyl chloride; and copolymerizing the vinyl chloride, acrylonitrile and vinyl pyridine in a closed vessel at a temperature of from 30° C. to 80° C.

PAUL JOHN CULHANE.
GEORGE MOORE ROTHROCK.

References Cited in the file of this patent

UNITED STATES PATENTS

| Number | Name | Date |
|---|---|---|
| 2,436,926 | Jacobson | Mar. 2, 1948 |
| 2,471,959 | Hunt | May 31, 1949 |
| 2,473,548 | Smith | June 21, 1949 |